United States Patent [19]

Rubin et al.

[11] 4,151,189

[45] Apr. 24, 1979

[54] SYNTHESIZING LOW SODIUM CRYSTALLINE ALUMINOSILICATE ZEOLITES WITH PRIMARY AMINES

[75] Inventors: Mae K. Rubin, Bala Cynwyd, Pa.; Edward J. Rosinski, Pedricktown; Charles J. Plank, Woodbury, both of N.J.

[73] Assignee: Mobil Oil Corporation, New York, N.Y.

[21] Appl. No.: 894,887

[22] Filed: Apr. 10, 1978

Related U.S. Application Data

[63] Continuation-in-part of Ser. No. 879,337, Feb. 23, 1978, abandoned, which is a continuation of Ser. No. 395,213, Sep. 7, 1973, abandoned.

[51] Int. Cl.$^2$ ............................................. C07F 5/06
[52] U.S. Cl. .................................. 260/448 C; 423/329
[58] Field of Search ............... 423/118, 327, 328, 329; 260/448 C

[56] References Cited

U.S. PATENT DOCUMENTS

| 2,859,234 | 11/1958 | Clem ................................ 260/448 C |
| 3,306,922 | 2/1967 | Barrer .............................. 260/448 C |

FOREIGN PATENT DOCUMENTS

| 2212180 | 11/1972 | Fed. Rep. of Germany ........... 423/328 |
| 2442240 | 3/1975 | Fed. Rep. of Germany ........... 423/329 |

OTHER PUBLICATIONS

Fieser et al., *Organic Chemistry*, D. C. Heath & Co., Boston, 1944, pp. 225–230.

*Primary Examiner*—Brian Hearn
*Attorney, Agent, or Firm*—Charles A. Huggett; Raymond W. Barclay; Claude E. Setliff

[57] ABSTRACT

A method is disclosed for synthesizing a crystalline aluminosilicate zeolite containing an organic nitrogen cation in the presence of a primary monoalkylamine having 2 to 9 carbon atoms in the alkyl portion. The method produces a zeolite having a very low percentage, i.e. less than about 0.14 weight percent, generally less than about 0.1 weight percent of alkali metal, e.g. sodium, in the as-synthesized form. The product can be used directly as a catalyst without intermediate precalcination and cation exchange. This is not possible with zeolites such as those of the ZSM-5 type synthesized by the methods of the art.

14 Claims, No Drawings

SYNTHESIZING LOW SODIUM CRYSTALLINE ALUMINOSILICATE ZEOLITES WITH PRIMARY AMINES

CROSS REFERENCE TO RELATED APPLICATIONS

This application is a continuation-in-part of U.S. Application Ser. No. 879,337 filed Feb. 23, 1978, now abandoned, which in turn is a continuation of U.S. application Ser. No. 395,213, filed Sept. 7, 1973, now abandoned.

FIELD OF THE INVENTION

This invention relates to a novel method for preparing crystalline aluminosilicates. More particularly, this invention relates to a method whereby crystalline aluminosilicates containing organic nitrogen cations are synthesized from a reaction mixture containing a primary alkylamine containing from 2 to 9 carbon atoms.

DESCRIPTION OF THE PRIOR ART

Crystalline aluminosilicates, both natural and synthetic, have been shown to contain a wide variety of positive ions. These aluminosilicates are rigid three-dimensional networks of $SiO_4$ and $AlO_4$ in which the tetrahedra are crosslinked by the sharing of oxygen atoms whereby the ratio of the total aluminum and silicon atoms to oxygen is 1:2. The electrovalence of the tetrahedra containing aluminum is balanced by the inclusion in the crystal of a cation. This cation in the initially formed crystalline aluminosilicate is generally an alkali metal. More recently, the cation has included organic nitrogen cations notably quarternary ammonium cations such as tetramethylammonium, tetraethylammonium, tetrapropylammonium and tetrabutylammonium. Inorganic cations can be exchanged either in entirety or partially by another type of cation utilizing ion exchange techniques in a conventional manner. Due to pore size limitations, organic cations are not necessarily susceptible to further cation exchange. The spaces between the tetrahedra are occupied by molecules of water prior to dehydration.

Prior art techniques of synthesizing crystalline aluminosilicates have involved the use of solutions containing a source of silica, alumina, alkali metal and the cation in the form in which it will exist in the synthesized aluminosilicate. This method has become rather expensive with the advent of crystalline aluminosilicates that contain tetraalkylammonium cations. The synthesis of these aluminosilicates has involved the addition of expensive quarternary ammonium cations to a reaction mixture in order to obtain the desired aluminosilicate. Furthermore, in order to exchange an ammonium or other cation into the zeolite preliminary to producing the active form of the catalyst, it has been necessary to calcine zeolites obtained from prior art methods, e.g. ZSM-5. It is these costly steps that the present invention seeks to avoid.

A related process is disclosed in U.S. Application Ser. No. 345,271, filed Mar. 27, 1973. The use of nitrogen compounds is taught, giving, in all instances reported a product having a high concentration of sodium. The nitrogen compound may be a product made by reacting $R_1R_2R_3N$ with $R_4X$ wherein $R_1$, $R_2$ and $R_3$ are hydrocarbyl or hydrogen and $R_4$ is hydrocarbyl. The nitrogen compound may also be entirely made up of amines of the formula $R_1R_2R_3N$. There is, however, no suggestion in the application that the amines contain from 2 to 9 carbon atoms and they must at the same time be primary.

SUMMARY OF THE INVENTION

This invention is to a method for synthesizing a crystalline aluminosilicate zeolite containing an organic nitrogen cation, wherein a reaction mixture comprising sources of silica, alumina, alkali metal, water and organo nitrogen cation precursor is prepared and maintained under conditions of temperature and pressure to effect crystallization of said aluminosilicate zeolite, the improvement wherein said precursor consists of a primary amine having 2 to 9 carbon atoms.

The stated mixture is stirred thoroughly and crystallized at a temperature from about 175° to about 400° F. in order to achieve crystallization within a resonable time. The temperature is preferably about 275° to about 375° F. The reaction is carried out under stirring at essentially autogenous pressure, preferably 70 to 400 psig for a time not less than about 4 hours, preferably for from about 24 hours to about 500 hours. Excess pressure due to inert gases in the reaction mixture are not harmful. The reaction is carried out in a closed vessel capable of withstanding the pressures used in this reaction. The resulting solid crystallized aluminosilicate can be removed, filtered and washed with water at about 60° to 200° F. The zeolite, as synthesized by this method, will have less than about 0.14% by weight of alkali metal. Generally the amount of alkali metal will range from about less than about 0.01% by weight to about 0.10% by weight of such metal. The specific range found is from less than about 0.01% by weight to 0.13% by weight of sodium.

DESCRIPTION OF SPECIFIC EMBODIMENTS

This invention discloses a method for preparing crystalline aluminosilicates containing the organic nitrogen cation. The crystalline aluminosilicates are prepared by the direct interaction of a primary monoalkylamine having 2 to 9 carbon atoms, sources of alumina, silica, water and alkali metal. A highly crystalline product is formed in a relatively short reaction time. The crystalline aluminosilicate that is formed contains N-containing organic material believed to be organic ammonium cations. This invention provides a method for synthesizing such a crystalline aluminosilicate without the use of expensive quarternary bases or salts, as has been necessary with prior processes. It also provides for exchange of ammonium or other ions if desired, into the zeolite without prior calcination.

The crystalline aluminosilicates of this invention can be prepared by utilizing materials which supply the appropriate oxide. Such compositions include sodium aluminate, aluminum sulfate, alumina, sodium silicate, silica hydrosol, silica gel, silica sol, silicic acid and sodium hydroxide. It will be understood that each oxide component utilized in the reaction mixture for preparing the above type crystalline aluminosilicate can be supplied by one or more initial reactants and then mixed together in any order. For example, sodium oxide can be supplied by an aqueous solution of sodium hydroxide, or by an aqueous solution of sodium silicate. One unique feature of this invention lies in the fact that precursors to the organic cation of the crystalline aluminosilicate may be used in the reaction mixture. As previously mentioned, this technique is especially useful in preparing crystalline aluminosilicates that contain primarily organoammonium cations, and correspondingly small amounts of alkali metal (e.g. sodium) cations.

In this invention, crystalline aluminosilicates containing organoammonium cations, are synthesized. These include ZSM-5, ZSM-12, ZSM-35 and ZSM-38. ZSM-5 is fully described in U.S. Pat. No. 3,702,886. ZSM-35 is taught in U.S. Pat. No. 4,016,245 and ZSM-38 is described fully in U.S. Application Ser. No. 560,412, filed Mar. 20, 1975. These two patents and the application are incorporated herein by reference in order to avoid unnecessarily lengthening this disclosure.

It will be understood that the invention is not limited to the zeolites mentioned hereinabove, but that it will include other zeolites having an organic nitrogen ion present in its structure.

Zeolite ZSM-5 has been previously prepared from a solution containing tetrapropyl ammonium hydroxide, sodium oxide, an oxide of aluminum, an oxide of silicon, and water, and having a composition falling within the following ranges:

|  | Broad | Preferred | Particularly Preferred |
|---|---|---|---|
| $OH^-/SiO_2$ | 0.07–1.0 | 0.1–0.8 | 0.2–0.75 |
| $R_4N^+/(R_4N^+ + Na^+)$ | 0.2–0.95 | 0.3–0.9 | 0.4–0.9 |
| $H_2O/OH^-$ | 10–300 | 10–300 | 10–300 |
| $SiO_2/Al_2O_3$ | 5–100 | 10–60 | 10–40 | wherein R is propyl, maintaining the mixture until crystals of the zeolite are formed. It is to be noted that an excess of tetrapropylammonium hydroxide can be used which would raise the value of $OH^-/SiO_2$ above the ranges set forth above. Thereafter, the crystals are separated from the liquid and recovered. Typical reaction conditions consist of heating the foregoing reaction mixture to a temperature of from about 210° F. to about 500° F. for a period of time from about six hours to 60 days. A more preferred temperature range is from about 300° F. to about 450° F. with the amount of time at a temperature in the range being from about 12 hours to 8 days.

As is apparent from the description of the prior art processes, crystalline zeolites are generally prepared in the alkali metal form of the aluminosilicate, usually the sodium form. For many catalytic purposes it is highly desirable to reduce the sodium of these zeolites to a low level, preferably less than about 0.15% by weight.

Ion exchange techniques will, of course, vary somewhat with the zeolite. In general, however, most zeolites are susceptible to the known ion exchange procedures. The original cation may be removed by subjecting the zeolite to an exchange solution, usually in a succession of exchanges. Where substantially complete removal of the original cation requires an inordinate number of separate exchanges, calcination between the first and second exchange is often successful as a means for cuttiing the time required.

All the sodium in, for example, sodium ZSM-5 type zeolites cannot be removed by the successive exchange method. When using this method, the sodium level reaches a plateau and changes very little with each successive exchange. One solution to this problem has been calcination on the sodium ZSM-5 types, either before exchange or after the exchange procedure has begun.

The method of this invention solves this problem in another way. That is to say, since the sodium level of the ZSM-5 type zeolite as synthesized is at or below that recommended for higher catalyst activity there is obviously no need for a calcination step.

The following examples illustrate the invention. They are to be viewed as illustrative only, and not as limiting the scope thereof.

EXAMPLE 1

In preparing the Examples described in Table 1 the general preparation scheme involved the preparation of several solutions. These are labelled A, B, and C in the accompanying Tables. In the preparing the first Example, Solution A is a solution of 450 grams Q-Brand silicate having composition listed on table as containing 28.9 wt.% $SiO_2$, 8.9 wt.% $Na_2O$, 62.2 wt.% $H_2O$ with addition in 562 grams water. Solution B is a solution of 15.4 g. $Al_2(SO_4)_3 \cdot 18H_2O$, 37.5 g. $H_2SO_4$, and 770 g. water. Solution C is the organic specie n-propylamine in the first seven Examples and isopropylamine in the last four Examples.

Add organic specie (C) to silica solution (A). To this was added $Al_2(SO_4)_3$—$H_2SO_4$ solution (B) and this was mixed until homogeneous, then charged to an autoclave for reaction at the indicated temperatures and times. The first Example in Table 1 was reacted at 350° F. for 44 hours. After the reaction was completed, the product was separated from the unreacted components by filtration and washing. The washed product after drying was analyzed for carbon, nitrogen, $Al_2O_3$, $SiO_2$ and total solids.

EXAMPLE 2

This Example differed from Example 1 in that the reaction time was 24 hours.

EXAMPLE 3

This Example differed from Example 1 in that the amount of n-propylamine was reduced to 25 g. and reaction time was 45 hours.

EXAMPLE 4

This Example differed from Example 1 in that the n-propylamine was reduced to 12.5 g. and reaction time was 45 hours.

EXAMPLE 5

This Example differed from Example 1 in that the amount of $Al_2(SO_4)_3 \cdot 18H_2O$ was increased to give a starting $SiO_2/Al_2O_3$ molar ratio of 40/1. Also the $Na_2O$ was lower and the reaction time at 350° F. was 66 hours.

EXAMPLE 6

This Example differed from Example 1 in that the reaction temperature was 196°–198° F., requiring the extension of reaction time to about 504 hours.

EXAMPLE 7

In preparing Example 7 the alkali metal ratio was lower, the $SiO_2/Al_2O_3$ ratio was 88.5, and the reaction time was 73 hours.

EXAMPLES 8–11

In preparing these Examples the organic specie was isopropylamine. In preparing Example 8, 50 g. was used. In Example 9, 25 g. was used and in Example 10, 12.5 g. was used. In Example 11, 50 g. was used.

In preparing Example 11 not only was the organic specie iso-propylamine but also the $Na_2O/Al_2O_3$ ratio was lower, as was the $SiO_2/Al_2O_3$ ratio.

The examples presented in Table 1 show that various types and levels of organic species can be used and that variations in $SiO_2/Al_2O_3$ ratios can be employed. Various times at 350° F. are shown. It is also shown that lower temperatures like 196°–198° F. will work if the time is extended.

The Examples detailed below and summarized in Table 2 (Examples 12–26) show the scope of functioning organic species and conditions that lead to the production of ZSM-5 having the desirably low sodium level. Here is is demonstrated that primary amines having 9 carbon atoms or less give ZSM-5 products having the requisite Na content. It should be noted that the static system for crystallization should be avoided, since this leads to exceptionally high levels of sodium content.

EXAMPLE 12

In Examples 12–26, solutions A, B and C were mixed in accordance with the directions in Example 1. Also, all products were filtered and washed.

824 g. of Ludox, a colloidal silica containing 30% by weight of $SiO_2$ (Solution A), 33 g. of sodium aluminate and 660 g. of water (Solution B) and 200 g. of 70% ethylamine (Solution C) were mixed and stirred at 300° F. for 72 hours.

EXAMPLE 13

45.0 g. of sodium silicate (Q-Brand), of the composition shown in Table 1, and 56.2 gm. of water (Solution A), 1.54 g. of $Al_2(SO_4)_3.18H_2O$, 3.75 g. of sulfuric acid and 77 g. of water (Solution B) and 6.2 gm. of n-butylamine (Solution C) were mixed and heated for 168 hours under static conditions at 300° F.

EXAMPLE 14

Starting materials were the same as in Example 13, except ten times as much of each was used. After mixing the mixture was stirred for 93 hours at 300° F.

EXAMPLE 15

45.0 g. of Q-Brand sodium silicate and 56.2 g. of water (Solution A), 1.54 g. of $Al_2(SO_4)_3.18H_2O$, 3.75 g. of sulfuric acid and 77.0 g. of water (Solution B) and 7.43 g. of n-pentylamine (Solution C) were mixed and heated for 192 hours at 300° F. under static conditions.

EXAMPLE 16

Same as Example 15, escept five times as much material was used and the reaction was for 90 hours at 300° F. with stirring.

EXAMPLES 17 and 18

Solutions A and B were the same as for Example 15. Solution C in both was 8.56 g. of n-hexylamine. Both Examples 17 and 18 were heated under static conditions. Example 17 was heated for 240 hours at 300° F., Example 18 for 120 hours at 320° F.

EXAMPLES 19 and 20

Solutions A and B were the same as for Examples 17 and 18 except ten times as much was used. Solution C in each was 8.56 g. of n-hexylamine. Both were stirred, Example 19 for 89 hours at 300° F., Example 20 for 93 hours at 320° F.

EXAMPLE 21

Solutions A and B were the same as for Examples 19 and 20. Solution C was 97.7 g. of n-heptylamine. The mixture was stirred for 92 hours at 300° F.

EXAMPLE 22

Solutions A and B were the same as for Example 21. Solution C was 109.5 g. of n-octylamine. The mixture was stirred for 93 hours at 300° F.

EXAMPLE 23

370 g. of Q-Brand sodium silicate and 463 g. of water (Solution A), 12.65 g. of $Al_2(SO_4)_3.18H_2O$, 30.82 g. of sulfuric acid and 634 g. of water (Solution B) and 100 gm. of n-nonylamine (Solution C) were mixed and stirred for 90 hours at 300° F.

EXAMPLE 24

Solutions A and B were the same as for Example 22. Solution C was 133.1 g. of n-decylamine. The mixed solutions were stirred for 92 hours at 300° F.

EXAMPLE 25

Solutions A and B were the same as for Example 24. Solution C was n-dodecylamine. The mixture was stirred for 90 hours at 300° F.

EXAMPLE 26

Same as Example 25, except Solution C was n-tetradecylamine.

TABLE I

| Example | | 1 | 2 | 3 | 4 | 5 |
|---|---|---|---|---|---|---|
| Staring Components, gms. | | 450 | 450 | 450 | 450 | 319 |
| A. Sodium Silicate | | | | | | |
| wt. % | (28.9 $SiO_2$) | | | | | |
| | (8.9 $Na_2O$) | | | | | |
| | (62.2 $H_2O$) | | | | | |
| $H_2O$ | | 562 | 562 | 562 | 562 | 350 |
| B. $Al_2(SO_4)_3 . 18H_2O$ | | 15.4 | 15.4 | 15.4 | 15.4 | 25.2 |
| $H_2SO_4$ | | 37.5 | 37.5 | 37.5 | 37.5 | 25.0 |
| $H_2O$ | | 770 | 770 | 770 | 770 | 600 |
| C. n-Propylamine | | 50 | 50 | 25 | 12.5 | 50 |
| Mix Ratio - Moles | | | | | | |
| $Na_2O$ | | 8.3 | 8.3 | 8.3 | 8.3 | 2.32 |
| n-propylamine | | 36.7 | 36.7 | 18.3 | 9.2 | 22.3 |
| $Na_2SO_4$ | | 19.6 | 19.6 | 19.6 | 19.6 | 9.7 |
| $Al_2O_3$ | | 1.0 | 1.0 | 1.0 | 1.0 | 1.0 |
| $SiO_2$ | | 93.5 | 93.5 | 93.5 | 93.5 | 40.5 |
| $H_2O$ | | 3877 | 3877 | 3877 | 3877 | 1679 |
| Crystallization* | | | | | | |
| Temp., ° F. | | 350 | 350 | 350 | 350 | 350 |

TABLE I-continued

| | | | | | |
|---|---|---|---|---|---|
| Time, Hrs. | 44 | 24 | 45 | 45 | 66 |
| Pressure, psig. | 180 | — | 130 | 130 | 170 |
| Product | ZSM-5 | ZSM-5 | ZSM-5 | ZSM-5 | TSM-5 |
| % | 105 | 105 | 105 | 85 | 90 |
| Composition | | | | | |
| N, wt. % | 0.99 | | 1.17 | | 1.34 |
| C, wt. % | 2.75 | | 3.36 | | 3.71 |
| $Na_2O$, wt. % | 0.01 | 0.04 | 0.02 | 0.07 | 0.01 |
| $Al_2O_3$, wt. % | 2.52 | | 2.32 | | 4.5 |
| $SiO_2$, wt. % | 97.2 | | 97.8 | | 94.6 |

| Example | 6 | 7 | 8 | 9 | 10 | 11 |
|---|---|---|---|---|---|---|
| Starting Components, gms. | 450 | 62.5 | 450 | 450 | 450 | 319 |
| A. Sodium Silicate (28.9 $SiO_2$) wt. % (8.9 $Na_2O$) (62.2 $H_2O$) | | | | | | |
| $H_2O$ | 562 | 84.4 | 562 | 562 | 562 | 350 |
| B. $Al_2(SO_4)_3 \cdot 18H_2O$ | 15.5 | 2.31 | 15.4 | 15.4 | 15.4 | 25.2 |
| $H_2SO_4$ | 37.5 | 5.63 | 37.5 | 37.5 | 37.5 | 25.0 |
| $H_2O$ | 770 | 115.5 | 770 | 770 | 770 | 600 |
| C. n-Propylamine | 50 | 7.5 | | | | |
| iso-propylamine | | | 50 | 25 | 12.5 | 50 |
| Mix Ratio - Moles | | | | | | |
| $Na_2O$ | 8.3 | 6.8 | 8.4 | 8.4 | 8.4 | 2.4 |
| propylamine | 36.7 | 37.6 | 36.8 | 18.4 | 9.2 | 22.4 |
| $Na_2SO_4$ | 19.6 | 19.7 | 19.7 | 19.6 | 19.6 | 9.8 |
| $Al_2O_3$ | 1.0 | 1.0 | 1.0 | 1.0 | 1.0 | 1.0 |
| $SiO_2$ | 93.5 | 88.5 | 94.4 | 93.5 | 93.5 | 40.7 |
| $H_2O$ | 3877 | 3902 | 3894 | 3877 | 3877 | 1706 |
| Crystallization* | | | | | | |
| Temp., °F. | 196–98 | 350 | 350 | 350 | 350 | 350 |
| Time, Hrs. | 504 | 73 | 24 | 24 | 24 | 96 |
| Pressure, psig. | — | — | 200 | — | — | — |
| Product | | | | | | |
| X-ray analysis | ZSM-5 | ZSM-5 | ZSM-5 | ZSM-5 | ZSM-5 | ZSM-5+$SiO_2$ |
| % | 80 | 85 | 90 | 90 | 90 | 80 |
| Composition | | | | | | |
| N, wt. % | | | 0.84 | | | |
| C, wt. % | | | 2.37 | | | |
| $Na_2O$, wt. % | 0.07 | 0.22 | <0.01 | 0.07 | 0.05 | 0.05 |
| $Al_2O_3$ | | | 2.48 | | | 4.4 |
| $SiO_2$, wt. % | | | 95.9 | | | |

*Examples 1–5 and 8–11 were carried out under stirring in an autoclave, Example 6 under stirring in a glass flask and Example 7 under static conditions in a steel autoclave.

TABLE 2

| Example | Product | %, from X-Ray | N | Na | $Al_2O_3$ | $SiO_2$ |
|---|---|---|---|---|---|---|
| 12 | ZSM-5 | 85 | 0.81 | <0.01 | 5.47 | 92.9 |
| 13 | ZSM-5 | 75 | | 1.1 | | |
| 14 | ZSM-5 | 100 | 1.49 | 0.08 | 2.44 | 94.8 |
| 15 | ZSM-5 | 80 | | 0.66 | | |
| 16 | ZSM-5 | 100 | 1.27 | 0.07 | 2.17 | 93.8 |
| 17 | — | Amorphous | | | | |
| 18 | ZSM-5 | 90 | | 0.07 | | |
| 19 | ZSM-5 | 110 | 1.30 | 0.09 | 2.47 | 96.0 |
| 20 | ZSM-5 | 115 | 1.32 | 0.11 | 2.26 | 94.6 |
| 21 | ZSM-5 | 80 | | 0.10 | | |
| 22 | ZSM-5 | 125 | | 0.06 | | |
| 23 | ZSM-5 | 90 | | 0.13 | | |
| 24 | ZSM-5 | 95 | | 0.17 | | |
| 25 | ZSM-5 | 110 | | 0.29 | | |
| 26 | ZSM-5 | 115 | | 0.55 | | |

A charge stock consisting essentially of 50% by weight of each of n-heptane and benzene were passed over the catalyst prepared from the product of Example 12 at the following conditions:

Temperature—600° F.
WHSV—20
Pressure—400 psig
$H_2/HC$—3/1

The catalyst was prepared by exchanging the Example 12 product with $NH_4Cl$ at 210° F. then calcining at 1000° F. The results with this catalyst are shown below.

n-Heptane conversion—97.5%
Benzene conversion—27.6%
$C_7^+$ Aromatics—27.1%
Selectivity—0.27

The products of Examples 27–30 were prepared essentially in the manner as previously discussed using conditions and compositions indicated in Table 3. The data in Table 3 show that zeolites containing less than about 0.14 by weight of sodium are not obtained when using dialkylamines.

TABLE 3

| | SECONDARY AMINES | | | |
|---|---|---|---|---|
| Examples | 27 | 28 | 29 | 30 |
| Starting Components, gm. | | | | |
| A. Q-Brand | 450 | 450 | 45.0 | 45.0 |
| $H_2O$ | 562 | 562 | 56.2 | 56.2 |
| B. $Al_2(SO_4)_3 \cdot 18H_2O$ | 15.4 | 15.4 | 1.54 | 1.54 |
| $H_2SO_4$ | 37.5 | 37.5 | 3.75 | 3.75 |
| $H_2O$ | 770 | 770 | 77.0 | 77.0 |
| C. Dipropylamine | 85.6 | | | |
| Dibutylamine | | 110 | | |
| Diisopropylamine | | | 8.58 | |
| Diisobutylamine | | | | 11.0 |
| Crystallization | (1) | (1) | (2) | (2) |
| Temp., °F. | 295 | 300 | 320 | 320 |
| Time, hours | 89 | 92 | 90 | 119 |
| Product | ZSM-5 | ZSM-5 | Amor. | Amor. |
| X-Ray Analysis | 100% | 100% | | |
| Composition, wt. % | | | | |
| Na | 0.22 | 0.23 | | |

(1) Stirred autoclave
(2) Static autoclave

We claim:

1. In a method for synthesizing a crystalline aluminosilicate zeolite containing an organic nitrogen cation and selected from the group consisting of ZSM-5, ZSM-12, ZSM-35 and ZSM-38, wherein a reaction mixture comprising sources of silica, alumina, alkali metal, water and organo nitrogen cation precursor is prepared and maintained under conditions of temperature and pressure to effect crystallization of said aluminosilicate zeolite, the improvement wherein said precursor consists of a primary amine having 2 to 9 carbon atoms, wherein said zeolite contains, in the as-synthesized form, less than 0.14% by weight of alkali metal and wherein said mixture is stirred during the synthesis of said zeolite.

2. The method of claim 1 in which the said alkali metal is sodium.

3. The method of claim 1 wherein said zeolite is ZSM-5.

4. The method of claim 1 wherein the temperature to effect crystallization is from about 175° F. to about 400° F.

5. The method of claim 1 in which the zeolite as synthesized has from less than about 0.01% to about 0.10% by weight of sodium.

6. The method of claim 1 wherein the amine is n-propylamine.

7. The method of claim 1 wherein the amine is iso-propylamine.

8. The method of claim 1 wherein the amine is butylamine.

9. The method of claim 1 wherein the amine is ethylamine.

10. The method of claim 1 wherein the amine is n-pentylamine.

11. The method of claim 1 wherein the amine is n-hexylamine.

12. The method of claim 1 wherein the amine is n-heptylamine.

13. The method of claim 1 wherein the amine is n-octylamine.

14. The method of claim 1 wherein the amine is n-nonylamine.

* * * * *

UNITED STATES PATENT OFFICE
CERTIFICATE OF CORRECTION

Patent No. 4,151,189          Dated April 24, 1979

Inventor(s) M. K. Rubin et al.

It is certified that error appears in the above-identified patent and that said Letters Patent are hereby corrected as shown below:

Column 2, line 3, "and" should read --and--.

Top portion of Table 1 (continued) which appears as:

TABLE I-continued

| Time, Hrs. | 44 | 24 | 45 | 45 | 66 |
|---|---|---|---|---|---|
| Pressure, psig. | 180 | — | 130 | 130 | 170 |
| Product | ZSM-5 | ZSM-5 | ZSM-5 | ZSM-5 | TSM-5 |
| % | 105 | 105 | 105 | 85 | 90 | should appear as follows:

Table 1 - continued

| Time, Hrs. | 44 | 24 | 45 | 45 | 66 |
|---|---|---|---|---|---|
| Pressure, psig. | 180 | - | 130 | 130 | 170 |
| Product X-ray analysis | ZSM-5 | ZSM-5 | ZSM-5 | ZSM-5 | ZSM-5 |
| % | 105 | 105 | 105 | 85 | 90 |

Signed and Sealed this

Seventeenth Day of July 1979

[SEAL]

Attest:

LUTRELLE F. PARKER

*Attesting Officer*     *Acting Commissioner of Patents and Trademarks*